United States Patent
Franke et al.

(10) Patent No.: US 7,499,644 B2
(45) Date of Patent: Mar. 3, 2009

(54) VEHICLE WITH A CATADIOPTRIC CAMERA

(75) Inventors: Uwe Franke, Uhingen (DE); Alexander Wuerz-Wessel, Stuttgart (DE)

(73) Assignee: Daimler AG, Stuttgart (DE)

( * ) Notice: Subject to any disclaimer, the term of this patent is extended or adjusted under 35 U.S.C. 154(b) by 184 days.

(21) Appl. No.: 10/543,574

(22) PCT Filed: Jan. 19, 2004

(86) PCT No.: PCT/EP2004/000349

§ 371 (c)(1),
(2), (4) Date: Jul. 27, 2005

(87) PCT Pub. No.: WO2004/068440

PCT Pub. Date: Aug. 12, 2004

(65) Prior Publication Data
US 2006/0078328 A1   Apr. 13, 2006

(30) Foreign Application Priority Data
Jan. 27, 2003   (DE) ................................ 103 03 013

(51) Int. Cl.
G03B 17/48 (2006.01)
H04N 7/18 (2006.01)
H04N 9/47 (2006.01)
B60Q 1/00 (2006.01)
B60Q 1/48 (2006.01)
G08G 1/16 (2006.01)
G08G 1/14 (2006.01)

(52) U.S. Cl. ........................ 396/429; 348/118; 348/148; 348/E7.088; 340/436; 340/903; 340/932.2

(58) Field of Classification Search ................. 396/429; 359/725, 729, 366, 859, 435, 740; 340/903, 340/932.2, 118, 435, E7.087, E7.088, 461, 340/436; 348/118, 148, E7.087, E7.088; 382/293
See application file for complete search history.

(56) References Cited

U.S. PATENT DOCUMENTS

| 4,968,124 | A | * | 11/1990 | Deckert et al. ............... 359/435 |
| 5,027,200 | A | * | 6/1991 | Petrossian et al. ........... 348/118 |
| 5,646,614 | A | * | 7/1997 | Abersfelder et al. ...... 340/932.2 |
| 6,421,081 | B1 | * | 7/2002 | Markus ....................... 348/148 |
| 6,449,103 | B1 | * | 9/2002 | Charles ....................... 359/725 |

(Continued)

FOREIGN PATENT DOCUMENTS

NL        9 400 821 A        1/1996

(Continued)

OTHER PUBLICATIONS

Baker et al.: "Theory of Catadioptric Image Formation", ICCV'98, Bombay, Jan. 4-7, 1998, IEEE, pp. 35-42, New York.

*Primary Examiner*—Melissa J Koval
(74) *Attorney, Agent, or Firm*—Patent Central LLC; Stephan A. Pendorf

(57) ABSTRACT

The invention relates to a vehicle (1) comprising at least one catadioptric camera (2), which is mounted on the vehicle and which has an optical axis (5) and at least one first mirror (6) that is arranged on the optical axis. The optical axis (5) of the camera (2) is slanted relative to a vertical (9).

8 Claims, 2 Drawing Sheets

U.S. PATENT DOCUMENTS

| | | | |
|---|---|---|---|
| 6,538,827 B2 * | 3/2003 | Bos | 359/740 |
| 6,575,643 B2 * | 6/2003 | Takahashi | 396/351 |
| 6,611,202 B2 * | 8/2003 | Schofield et al. | 340/461 |
| 6,611,282 B1 | 8/2003 | Trubko et al. | 348/36 |
| 2002/0005896 A1 | 1/2002 | Kumata et al. | 348/148 |
| 2002/0080017 A1 | 6/2002 | Kumata et al. | 340/436 |
| 2002/0181803 A1 | 12/2002 | Kawakami et al. | 382/293 |
| 2002/0186298 A1 | 12/2002 | Ikeda | 348/148 |

FOREIGN PATENT DOCUMENTS

| | | |
|---|---|---|
| WO | WO 03/042743 A | 5/2003 |

* cited by examiner

VEHICLE WITH A CATADIOPTRIC CAMERA

CROSS REFERENCE TO RELATED APPLICATION

This application is a national stage of PCT/EP2004/000349 filed Jan. 19, 2004 and based upon DE 103 03 013.1 filed Jan. 27, 2003 under the International Convention.

BACKGROUND OF THE INVENTION

1. Field of the invention

The present invention relates to a vehicle with at least one catadioptric camera fitted on the vehicle. The camera is one in which at least one curved mirror arranged on the optical axis of the camera is used as an imaging element. The camera allows panoramic viewing in directions transverse to the optical axis, with an azimuth angle of up to 360° with respect to the latter. According to the invention, the catadioptric camera is preferably used to monitor the space at the back and front of the vehicle.

2. Related Art of the Invention

Along the optical axis, the field of view of a catadioptric camera is bounded in both directions by conical blind regions. The field of view boundary of such a cone, or its semivertex angle, is dictated by the configuration of the camera itself, for instance the spatial extend and arrangement of the imaging elements.

EP 1 197 937 A1 relates to a spatial monitoring system for a vehicle, which comprises a catadioptric camera with an optical axis oriented vertically. EP 1 158 473 A2 also relates to such a spatial monitoring system.

Since the blind regions of a catadioptric camera cannot be made arbitrarily small, there are regions in the immediate vicinity of the vehicle which cannot be seen by these known spatial monitoring systems.

SUMMARY OF THE INVENTION

It is an object of the present invention to provide a vehicle which has at least one catadioptric camera fitted on the vehicle, and which ensures improved spatial monitoring.

Accordingly, the invention relates to a vehicle with at least one catadioptric camera fitted on the vehicle, which has an optical axis and at least a first mirror arranged on the optical axis. The optical axis is inclined with respect to a vertical. This has the advantage that the camera can also observe spatial regions in the immediate vicinity of the vehicle, in particular road surfaces, which would lie in the blind regions of the camera if its optical axis was arranged vertically. The oblique setting is preferably selected so that the vehicle completely fills up one of the blind regions.

If the optical axis of the catadioptric camera is inclined by an angle $\alpha$ with respect to a vertical, and the cone forming an upper blind region has a semivertex angle $\beta$, and then it is preferable for the angles $\alpha$ and $\beta$ to satisfy the following inequality: $\beta<90°-\alpha$. This ensures that the field of view of the camera always comprises a horizontal, so that even distant objects can be detected in the direction of this horizontal.

The semivertex angle of the cone forming the second blind region, or lower blind region, is denoted by $\chi$. This blind region is generally filled at least partially by the vehicle itself. According to the invention, this semivertex angle $\chi$ is preferably greater than the angle $\alpha$. This prevents the camera from detecting unnecessarily large areas of the vehicle which are generally not of interest to be observed.

Preferably, the angles $\chi$ and $\alpha$ satisfy the following inequality: $\chi<\alpha+30°$. This ensures on the one hand that the field of view of the camera is directed far downward so that, for example, the fenders of the vehicle lie in the field of view of the camera, but on the other hand, as already mentioned above, unnecessarily large areas of the vehicle such as front or rear surfaces are not also detected.

A catadioptric camera is preferably mounted on the nose and/or the rear of the vehicle. This makes it possible to monitor the space at the back and front of the vehicle. This is important especially when parking the vehicle. The catadioptric camera may in this case be mounted on the engine hood, on the trunk door, on the fenders or on the bodywork above the fenders.

If the angles $\alpha$, $\beta$ and $\chi$ are selected as indicated, then both the fender of the vehicle and a horizontal lie in the field of view of the catadioptric camera, which is mounted on the nose or rear of the vehicle. This allows optimal monitoring of the environment of a vehicle, especially when the space in front of or behind the vehicle needs to be monitored for parking.

Nevertheless, if a lateral environment of the vehicle is intended to be monitored, it is also possible to fit the catadioptric camera on the side bodywork of the vehicle or, for example, to integrate it in the exterior rear view mirrors.

The vehicle preferably has a device for retracting and deploying the catadioptric camera.

In the vehicle according to the invention, the catadioptric camera preferably has a second mirror, which is arranged opposite the first mirror on the optical axis. Such a catadioptric camera with two mirror surfaces is described, for example, in WO 00/41024.

BRIEF DESCRIPTION OF THE DRAWINGS

The present invention will now be explained in more detail by way of example with reference to the following figures, in which.

DETAILED DESCRIPTION OF THE INVENTION

Figure 1:
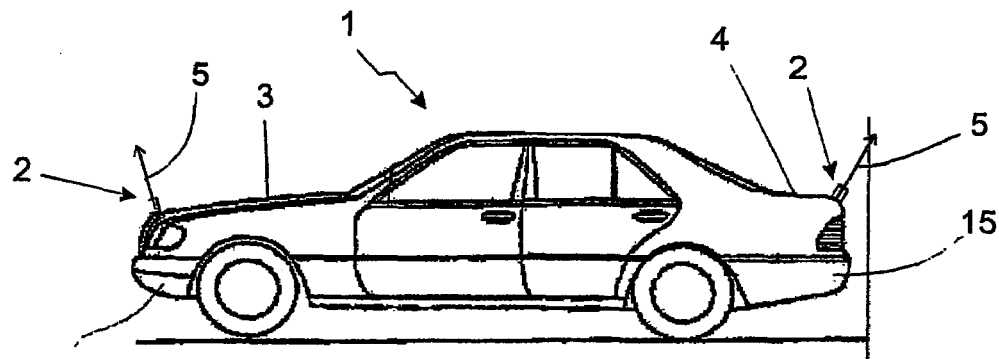
FIG. 1 shows a schematic side of view of an embodiment of the vehicle 1 according to the invention.
Figure 2:
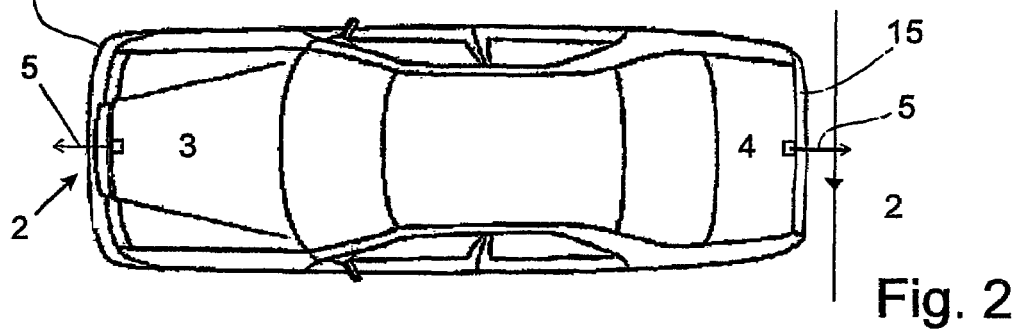
FIG. 2 shows a schematic plan view of the vehicle 1 according to FIG. 1.

FIGS. 1 and 2 shows a side view and a plan view of a configuration of a vehicle 1 according to the invention, with an engine hood 3, a trunk door 4 and fenders 15. The vehicle 1 has two catadioptric cameras 2. One of the cameras 2 is mounted on the engine hood 3 of the vehicle, and the other camera 2 is mounted on the trunk door 4 of the vehicle, both in a position near the edge. The cameras may, however, also be fitted on the fenders 15. The cameras 2 respectively have an optical axis 5. The pictures delivered by the cameras 2 are processed, and an image resulting from this is provided to the driver of the vehicle 1 via a screen device (not shown). The pictures delivered by the cameras 2 may, however, also be used to automatically determine the distance of the vehicle 1 from neighboring vehicles or obstacles, for example with the aid of a suitably programmed microprocessor.

The vehicle 1 furthermore has devices (not shown) for retracting and deploying the camera 2. When the cameras 2 are not needed, they can be fully retracted so that they no longer protrude from the surfaces of the engine hood 3 and the trunk door 4. By using a cover (not shown), the cameras 2 in the retracted state are protected from the effects of dirt and weather. Retractability of the cameras 2 also has the advantage that they are protected from the airflow when the vehicle 1 is driving at a substantial speed. In the retracted state, they furthermore do not impair the esthetic appearance of the vehicle 1. When the cameras 2 are needed, for example as an aid to parking, they can be deployed with the aid of the aforementioned device.

Figures 3, 4:
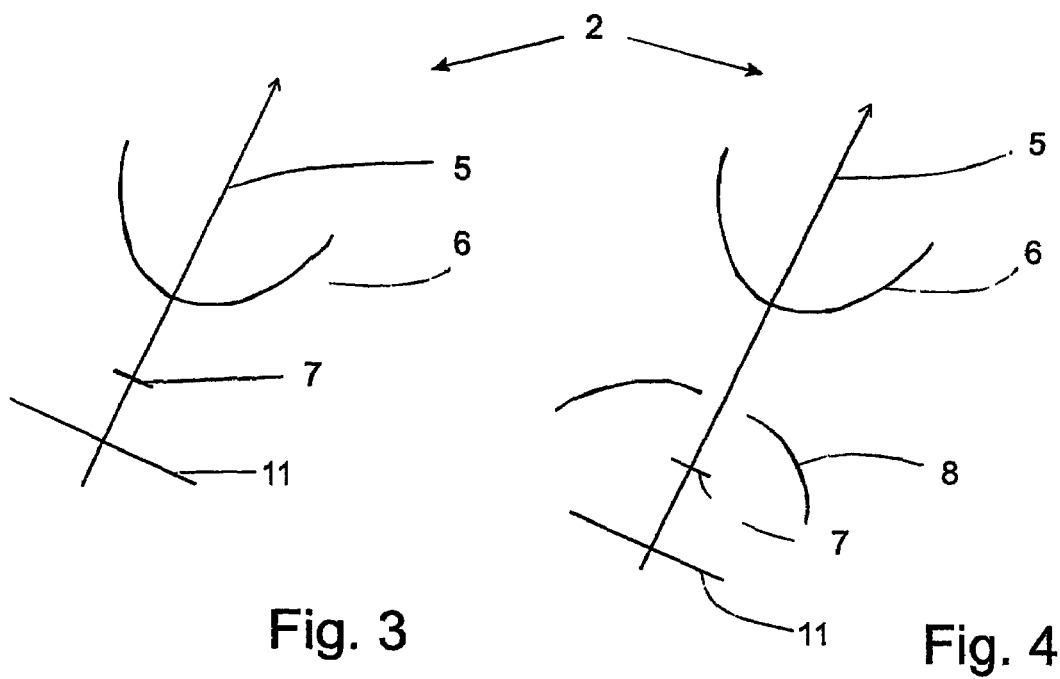
FIG. 3 shows a sketch of one configuration of a catadioptric camera 2.
FIG. 4 shows a sketch of another configuration of a catadioptric camera 2.

FIGS. 3 and 4 show sectional views of two configurations of catadioptric cameras 2, which the vehicle according to the invention may have. On the optical axis 5 of each camera 2, there is at least a first mirror 6. The first mirror 6 has a hyperboloid mirror surface. Nevertheless, it may also be a spherical, ellipsoid or paraboloid mirror surface. The reference numeral 7 denotes a lens 7. The camera 2 shown in FIG. 4 also has a further, second mirror 8 which lies opposite the first mirror 6 on the optical axis 5. The mirror 8 likewise has a hyperboloid mirror surface. Nevertheless, it may also be an ellipsoid, paraboloid or planar mirror surface. The lens 7 is inserted into a central bore of this mirror 8. The field of view detected by the camera 2 is imaged on an image plane 11. A highly distorted perspective image is thereby obtained. The distortions are corrected computationally, for example with the aid of a microprocessor (not shown) in order to obtain an image which reproduces the environment detected around the vehicle as freely as possible from distortion and which, when displayed on a screen, allows the driver of the vehicle to intuitively assess the environment.

Figure 5:
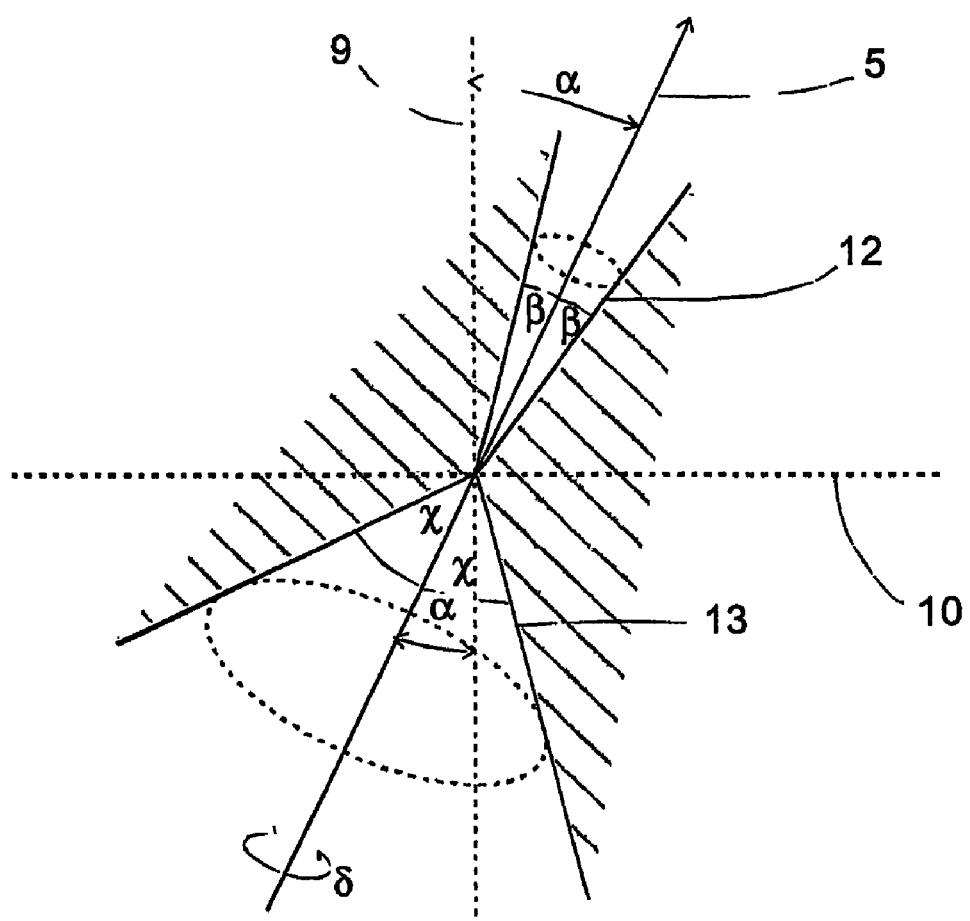
FIG. 5 shows a sketch to explain the field of view of the rear catadioptric camera 2 in FIGS. 1 and 2.

FIG. 5 shows a sketch which explains the field of view of the rear catadioptric camera 2. The optical axis 5 of the camera 2 is inclined by an angle $\alpha$ with respect to a vertical 9, which is represented by dashes. The reference numeral 10 denotes a horizontal. The field of view of the catadioptric camera 2, represented by shading in the Fig., is bounded upward by a first, upper cone 12 lying on the optical axis 5. It has a semivertex angle $\beta$. The angles $\alpha$ and $\beta$ satisfy the following inequality: $\beta<90°-\alpha$. This ensures that the field of view of the camera 2 always includes the horizontal 10. Downward, the field of view of the camera 2 is bounded by a second, lower cone 13. It has a semivertex angle $\chi$. This semivertex angle $\chi$ need not be less than the angle $\alpha$, since $\chi=\alpha$ would correspond to the case in which the camera can look vertically downward. In most practically relevant installation situations, moreover, parts of the vehicle which it is not of interest to observe lie vertically below the camera. On the other hand, $\chi$ should also not be greater than $\alpha+30°$. This means that the field of view of the camera reaches down so steeply that the fender 15 still lies in it, and objects on the road can still be detected even at a short distance from the fender 15 of the vehicle 1.

In the azimuth direction, the field of view of the camera 2 extends over an angle $\delta$ of 360°, although it may also be interrupted on the side facing the vehicle, the left-hand side in FIG. 5, without significantly compromising the effectiveness of the camera.

The invention claimed is:

1. A vehicle (1) with at least one catadioptric camera (2) fitted on the vehicle (1), which has an optical axis (5) and at least a curved first mirror (6) arranged on the optical axis, wherein the optical axis (5) is inclined by an angle $\alpha$ with respect to an upward vertical (9) that is perpendicular to a vehicle base, wherein the camera remains so oriented, that it's field of view continuously encompasses both a fender (15) of the vehicle and a horizontal (10), such that distant objects can be detected, wherein the field of view is bounded by an upper cone (12) with a semivertex angle $\beta$, which is centered on the optical axis (5), the angles $\alpha$ and $\beta$ satisfying the following inequality: $\beta<90°-\alpha$.

2. The vehicle (1) as claimed in claim 1, wherein the catadioptric camera (2) has a second mirror (8), which is arranged opposite the first mirror (6) on the optical axis.

3. The vehicle (1) as claimed in claim 1, wherein a catadioptric camera (2) is mounted on the front and/or the rear of the vehicle (1).

4. A vehicle (1) with at least one catadioptric camera (2) fitted on the vehicle (1), which has an optical axis (5) and at least a curved first mirror (6) arranged on the optical axis, wherein the optical axis (5) is inclined by an angle $\alpha$ with respect to an upward vertical (9) that is perpendicular to a vehicle base, wherein the camera remains so oriented, that it's field of view continuously encompasses both a fender (15) of the vehicle and a horizontal (10), such that distant objects can be detected, wherein the field of view of the catadioptric camera (2) is bounded by a lower cone (13) with a semivertex angle $\chi$, which is centered on the optical axis (5), the semivertex angle $\chi$ being greater than the angle $\alpha$.

5. A vehicle (1) with at least one catadioptric camera (2) fitted on the vehicle (1), which has an optical axis (5) and at least a curved first mirror (6) arranged on the optical axis, wherein the optical axis (5) is inclined by an angle $\alpha$ with respect to an upward vertical (9) that is perpendicular to a vehicle base, wherein the camera remains so oriented, that it's field of view continuously encompasses both a fender (15) of the vehicle and a horizontal (10), such that distant objects can be detected, wherein the field of view of the catadioptric camera (2) is bounded by a lower cone (13) with a semivertex angle $\chi$, which is centered on the optical axis (5), the angles $\chi$ and $\alpha$ satisfying the following inequality: $\chi<\alpha+30°$.

6. A vehicle (1) with at least one catadioptric camera (2) fitted on the vehicle (1), which has an optical axis (5) and at least a curved first mirror (6) arranged on the optical axis, wherein the optical axis (5) is inclined by an angle $\alpha$ with respect to an upward vertical (9) that is perpendicular to a vehicle base, wherein the camera remains so oriented, that it's field of view continuously encompasses both a fender (15) of the vehicle and a horizontal (10), such that distant objects can be detected, wherein the field of view of a catadioptric camera is bounded by conical blind regions, wherein the incline of the optical axis (5) of the camera (2) with respect to the vertical is maintained such that the camera can also observe spatial regions in the immediate vicinity of the vehicle which would lie in the blind regions of the camera if its optical axis was arranged vertically, and wherein the incline of the optical axis (5) is selected so that the vehicle completely fills up one of the blind regions.

7. A vehicle (1) with at least one catadioptric camera (2) fitted on the vehicle (1), which has an optical axis (5) and at least a curved first mirror (6) arranged on the optical axis, wherein the optical axis (5) is inclined by an angle $\alpha$ with respect to an upward vertical (9) that is perpendicular to a vehicle base, wherein the camera remains so oriented, that it's field of view continuously encompasses both a fender (15) of the vehicle and a horizontal (10), such that distant objects can be detected, wherein the at least one catadioptric camera (2) is retractable so that it is fully retracted and no longer protruded from a surface of the vehicle when it is not needed, and deployable when it is needed.

8. The vehicle according to claim 7, wherein the camera is covered when it is in a retracted state to protect it from effects of dirt, whether and airflow and provide esthetic appearance of the vehicle.

* * * * *